United States Patent [19]

Dyer

[11] Patent Number: 5,003,864
[45] Date of Patent: Apr. 2, 1991

[54] GEARED AIR ACTUATOR

[75] Inventor: John Dyer, Cresskill, N.J.

[73] Assignee: Hoke Incorporated, Cresskill, N.J.

[21] Appl. No.: 458,434

[22] Filed: Dec. 28, 1989

[51] Int. Cl.$^5$ .......................... F01B 31/00; F01B 9/00
[52] U.S. Cl. ...................................... 92/132; 92/5 R; 92/136
[58] Field of Search .................. 92/5 R, 130 R, 136, 92/59, 128, 132

[56] References Cited

U.S. PATENT DOCUMENTS

| | | | |
|---|---|---|---|
| 1,734,155 | 11/1929 | Caminez | 92/136 X |
| 2,090,342 | 8/1937 | Callsen | 92/136 X |
| 2,408,338 | 9/1946 | Parsons | 92/136 X |
| 2,844,128 | 7/1958 | Steiner | 92/136 |
| 3,054,136 | 9/1962 | Schlage et al. | 92/136 |
| 3,246,581 | 4/1966 | Carr | 92/136 |
| 3,614,913 | 10/1971 | Clark | 92/132 X |
| 4,665,583 | 5/1987 | Frolov et al. | 92/136 |

Primary Examiner—Allen M. Ostrager
Attorney, Agent, or Firm—Stoll, Previto & Hoffman

[57] ABSTRACT

A geared air actuator comprising a piston mounted for movement within a housing. The piston has a front wall and a hollow body portion which extends rearwardly from the front wall. A spring is mounted within the hollow body portion of said piston. When pneumatic fluid is introduced into the housing and against the front of the piston, it moves the piston back against the action of the spring. When the introduction of pneumatic fluid is terminated the spring will move the piston back to its original position. The front wall of the piston is substantially thinner than the length of the body portion.

5 Claims, 2 Drawing Sheets 5,003,864

GEARED AIR ACTUATOR

BACKGROUND

The present invention relates to a geared air actuator and, more particularly, to a geared air actuator which is adapted to actuate a valve, such as a ball valve.

In the prior art, such actuators have utilized a rack and a pinion drive to operate the valve. Some such actuators have been provided with springs located at the ends of the actuators to enable them to move the actuators back at the end of their thrust. In other such actuators, the springs have been mounted around the outside of a piston. It has been found that existing actuators are bulky and require a separate rack to operate the pinion which, in turn, operates the valve.

Illustrations of actuators which have been used in the prior art are disclosed in U.S. Pat. No. 4,716,815 which shows a spring-passed two-way piston and U.S. Pat. No. 2,848,186 which discloses an actuator having a spring in a bore in one end of a solid elongated piston body.

BRIEF DESCRIPTION

The present invention avoids these drawbacks and has for one of its objects the provision of an improved geared air actuator which permits reduction in the size of the unit.

Another object of the present invention is the provision of an improved actuator which utilizes a piston with a spring mounted therein.

Another object of the present invention is the provision of an improved actuator which avoids the use of a separate rack.

Another object of the present invention is the provision of an improved geared air actuator in which spring means are provided within the piston to return it to its original position upon 180° rotation thereof.

Another object of the present invention is the provision of an improved geared air actuator in which the unit may easily be adapted to return the piston after rotation of 90° or some other desired rotational angle.

Another object of the present invention is the provision of an improved geared air actuator may be easily adapted to operate as a double-acting actuator.

Other and further objects of the invention will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings forming a part of the specification, wherein.

DESCRIPTION

Figure 1:
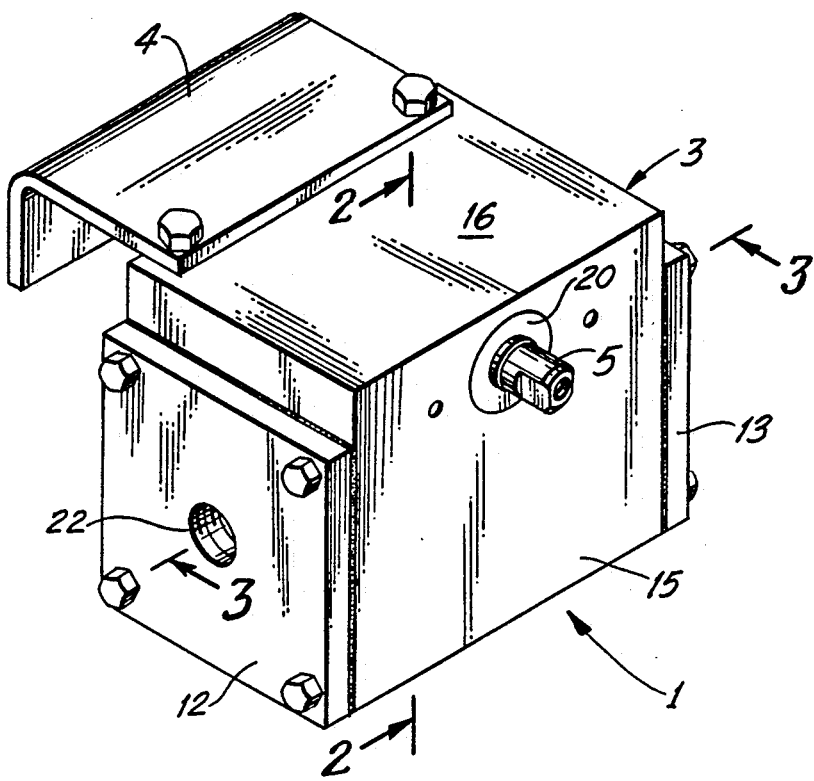
FIG. 1 is a perspective view showing the geared air actuator of the present invention.

Referring to the drawings, the actuator assembly 1 of the present invention is adapted to operate a valve, such as a ball valve (not shown), by means of a pinion assembly 2 extending through a housing 3 which has a mounting 4 extending therefrom on which the valve is mounted. The pinion assembly 2 comprises a pinion shaft 8 having a stub 5 at one end thereof, a pinion gear 7 and a valve connection stub 6 at its other end. The pinion gear 7 is located substantially centrally of the pinion shaft 8.

The housing 3 comprises an upper cavity 10 in which the pinion assembly 2 is mounted and a lower cavity 11 substantially at right angles to the upper cavity 10.

The housing 3 comprises a pair of front and rear end walls 12–13, a pair of side walls 14–15 and top and bottom walls 16–17 with the valve mounting 4 extending from the top wall 16. The side walls 14–15 are shown as being one piece with the top and bottom walls 16–17. However, they may be separated units mounted together, if desired, without departing from the invention. Plugs 20 and 21 are mounted in the ends of the upper cavity 8 to receive and act as journals for the stubs 5 and 6 of the pinion shaft 8 which extend beyond the side walls 14–15.

The end walls 12–13 are removably mounted on the side walls 14–15 and are sealed against leakage by washers 18–19. The front end wall 12 has a threaded opening 22 into which a pneumatic or some other fluid supply means (not shown) may be attached. The rear end wall 13 also has an opening 23 which in the preferred embodiment of the invention may be sealed by a plug 24 which is removable for certain operations of the geared air actuator, as will be discussed in greater detail hereinbelow.

As has already been referred to hereinabove, the lower cavity 11 has its axis substantially at right angle to the axis of the upper cavity 10 and the pinion assembly 2 mounted therein. Movably mounted within the lower hollow chamber 11 is a circular piston assembly 30 which is at right angle to the pinion assembly 2 of the upper cavity 5. The piston assembly 30 comprises a relatively narrow circular front piston wall 31. The front piston wall 31 has an outer face 35 having a circular front space 36 therein and an elongated body portion 33 extending rearwardly from the front piston wall 31 and terminating in rear stop 37. A hollow inner bore 32 is located in the elongated body portion 33. The inner bore 32 is open at its rear 38 and terminates at the inner face 39 of the front wall 31. Surrounding the body portion 33 is a gear thread 34 which meshes with the gear teeth 7 on the pinion shaft 8 which is at right angles thereto. Movement of the piston assembly 30 within the lower chamber 11 will rotate the pinion assembly 2 which, in turn, will operate the valve.

Located within the hollow inner bore 32 is a spring assembly 40 shown in the drawing as being a coil spring. The coil spring 40 is mounted between the rear wall 13 of the lower hollow chamber 11 and the inner wall 39 of the piston front wall 31 and exerts a pressure on the piston 31 biasing the piston 31 toward the housing front wall 12. The outer edges of the piston assembly 30 are sealed by O-rings 26 at both ends thereof.

Figure 4:
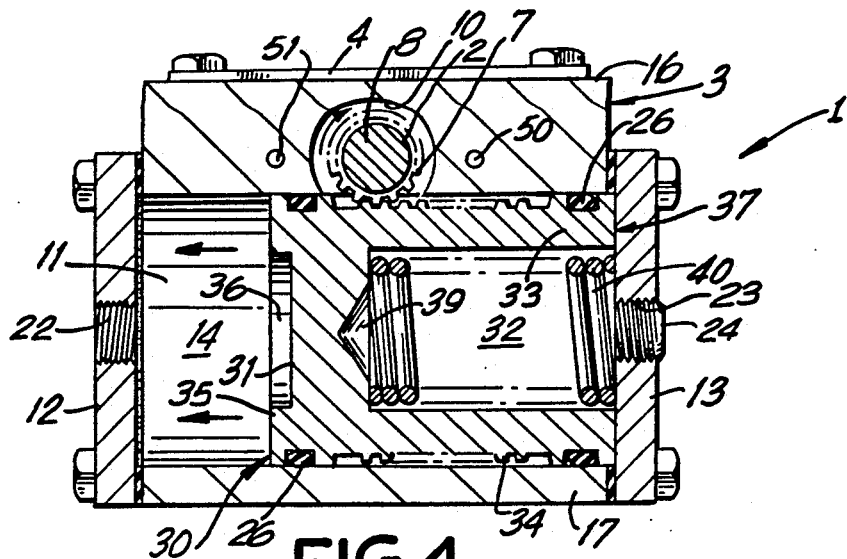
FIG. 4 is a sectional view similar to FIG. 3 showing the position of the actuator at the end of its thrust.

When pneumatic fluid is fed to the circular space 36 in the outer face 35 of the piston front wall 31 through the opening 22, the piston assembly 30 will move rearwardly against the pressure of the spring 40 toward the rear wall 13. As this rearward movement occurs, the outer threads 34 of the piston assembly 30 will mesh with the pinion gear teeth 7 and rotate the pinion shaft 8 which will actuate the valve through its connection 6. When the pinion shaft 8 has been rotated 180°, the piston assembly 30 has reached the end of its stroke with its rear stop 37 adjacent the rear wall 13. At this pinion pneumatic fluid pressure is stoppped and the spring 40 moves the piston assembly 30 back toward the front wall 12 of the housing as shown in FIG. 4.

The mounting of the spring 40 wholly within the bore 32 in the piston assembly 30 permits reduction in the size of all the parts, hence, enabling the unit to be smaller and to operate less expensively.

Figure 2:
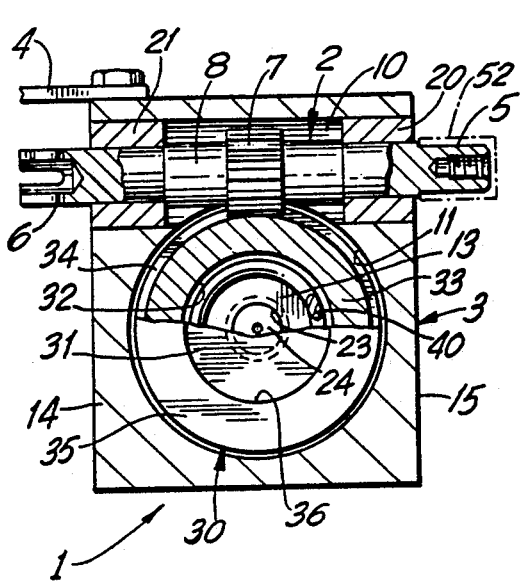
FIG. 2 is a sectional view taken along line 2—2 of FIG. 1.
Figure 3:
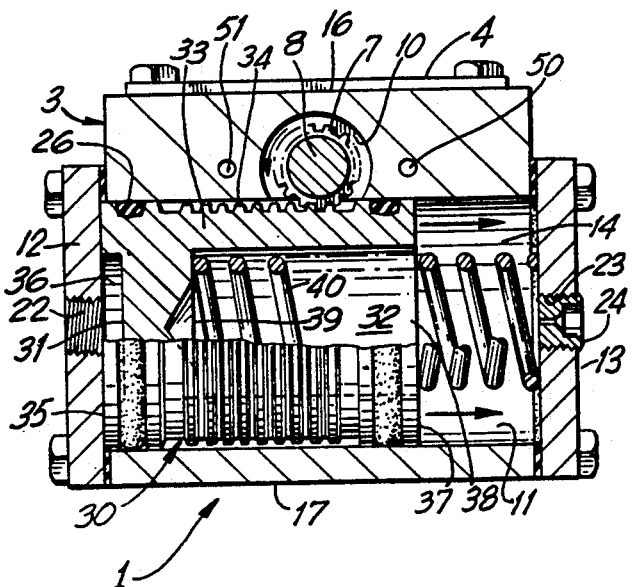
FIG. 3 is a sectional view taken along line 3—3 of FIG. 1.

If desired, limit switches may be provided at 50 and 51 in the top wall 16 as indicators of the position of the piston assembly 30 within the housing 11. Moreover, if desired, a manual override unit 52 may be (shown in broken lines in FIG. 2) affixed to the rear stub 5 of the pinion shaft 8.

Figure 5:
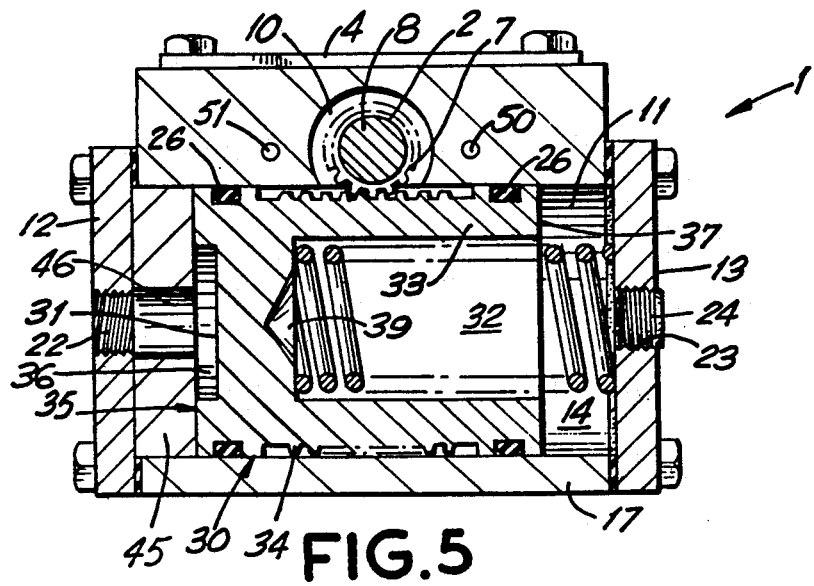
FIG. 5 is a sectional view similar to FIG. 3 showing another embodiment of the present invention.

FIG. 5 shows another embodiment of the present invention in which a spacer 45 in the form of a doughnut with a central opening 46 may be mounted between the front wall 12 and the front face 35 of the piston assembly 30. With this spacer in place, the piston assembly 30 is already partially located away from the front wall 12 as shown in FIG. 5, before pneumatic fluid is fed into the lower cavity 11. Hence, when pneumatic fluid is introduced into the lower cavity 11, the piston assembly 30 will move only a short distance away before it reaches the end of the stroke and is moved back toward the front wall 12 by the spring 40. Preferably, this shorter distance will rotate the pinion shaft about 90° rather than 180° as in the embodiment shown in FIGS. 1-4. However, it will be understood that the angular rotation of the pinion shaft 8 may be adjusted by merely using front spacers 45 of different thicknesses depending on the amount of rearward thrust of pinion assembly 30 and rotation of pinion shaft 8, which may be desired for any particular situation.

Figure 6:
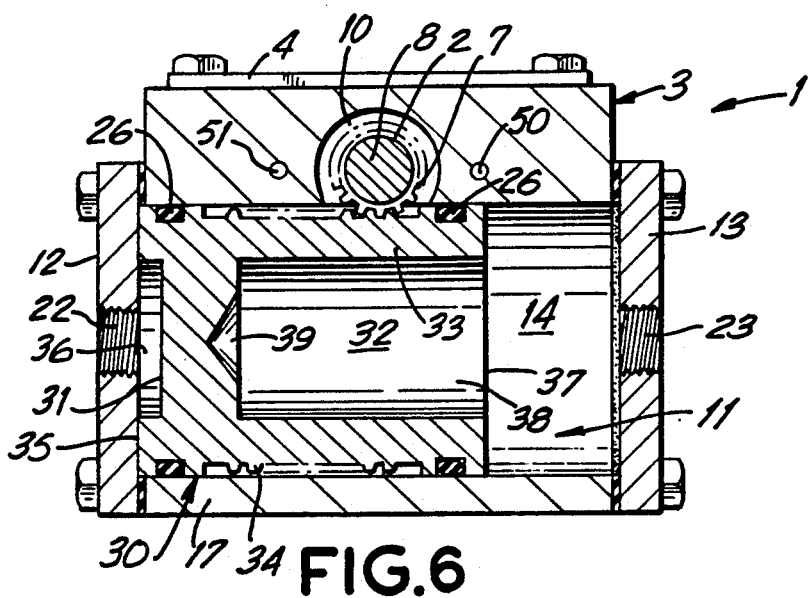
FIG. 6 is a sectional view similar to FIG. 3 showing still another embodiment of the present invention.

FIG. 6 shows another embodiment of the present invention in which the rear plug 24 is removed to unplug the opening 23 at the rear of the lower cavity 11. In this embodiment, spring 40 is removed and pneumatic fluid may be introduced into the lower cavity 11 from both openings 22 and 23 on both sides of the front wall 31 of the piston assembly 30 so that the piston assembly 30 can act as a two-way actuator.

It will thus be seen that the present invention provides an improved geared air actuator which permits reduction in the size of the unit, which utilizes a piston with a spring mounted therein and avoids the use of a separate rack. The present invention also provides an improved geared air actuator in which spring means are mounted within the piston to return it to its original position upon rotation thereof of 180° or 90° or some other desired rotational angle and which may be easily adapted to operate as a double-acting actuator.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A geared air actuator comprising a housing, a piston mounted for movement in said housing, said housing having a front end wall and a rear end wall, said piston having a front wall and a hollow body portion extending rearwardly therefrom, the front wall and the hollow body of the piston being located between said housing front and rear end walls, spring means mounted within the hollow body portion of said piston, means for introducing pneumatic fluid into the housing between said housing front end wall and said piston front wall to bear against the piston front wall and move the piston against the action of the spring means, whereby the spring will move the piston back to its original position upon termination of the introduction of pneumatic fluid into the housing, the front wall of the piston being substantially thinner than the length of the body portion of the piston, the said front wall and the body portion being non-rotationally mounted to each other, a gear thread circumventing a substantial portion of the circumferential outer surface of the body portion, said gear thread being located wholly between the housing front and rear end walls, a pinion rack at right angles to and meshing with the gear thread, said spring means being interposed between the inner surface of the front wall of the piston and the rear end wall of the housing.

2. A geared air actuator as claimed in claim 1 wherein said housing has a front wall with an opening therein to allow pneumatic fluid to enter the housing and impinge on the front face of the front wall of the piston.

3. A geared air actuator as claimed in claim 2 wherein spacer means are mounted between the front wall of the housing and the front face of the piston to limit the movement of the piston.

4. A geared air actuator as claimed in claim 2 wherein limit switches are provided as position indicators.

5. A geared air actuator as claimed in claim 2 wherein manual override means is provided on the pinion rack.

* * * * *